United States Patent
Lin et al.

(10) Patent No.: US 11,039,054 B2
(45) Date of Patent: Jun. 15, 2021

(54) IMAGE CAPTURING SYSTEM CAPABLE OF GENERATING DIFFERENT TYPES OF OPTIMIZED IMAGES

(71) Applicant: ArcSoft Corporation Limited, Zhejiang (CN)

(72) Inventors: Jian-Hua Lin, Hangzhou (CN); Chung-Yang Lin, Hangzhou (CN)

(73) Assignee: ArcSoft Corporation Limited, Zhejiang (CN)

( * ) Notice: Subject to any disclaimer, the term of this patent is extended or adjusted under 35 U.S.C. 154(b) by 0 days.

(21) Appl. No.: 17/002,743

(22) Filed: Aug. 25, 2020

(65) Prior Publication Data
US 2021/0144285 A1    May 13, 2021

(30) Foreign Application Priority Data
Nov. 7, 2019 (CN) .......................... 201911082021.1

(51) Int. Cl.
*H04N 5/76* (2006.01)
*H04N 5/225* (2006.01)
*H04N 5/232* (2006.01)

(52) U.S. Cl.
CPC ......... *H04N 5/2258* (2013.01); *H04N 5/2254* (2013.01); *H04N 5/23232* (2013.01); *H04N 5/23296* (2013.01)

(58) Field of Classification Search
CPC .................................................. H04N 5/23232
See application file for complete search history.

(56) References Cited

U.S. PATENT DOCUMENTS

| | | | | |
|---|---|---|---|---|
| 2013/0093842 A1* | 4/2013 | Yahata | ............... | H04N 5/23238 348/38 |
| 2015/0163478 A1* | 6/2015 | Geiss | ................... | H04N 13/243 348/47 |
| 2015/0334309 A1* | 11/2015 | Peng | ................... | H04N 5/23296 348/47 |
| 2017/0180615 A1* | 6/2017 | Lautenbach | ......... | H04N 5/2258 |
| 2017/0186163 A1* | 6/2017 | Kim | ....................... | H04N 5/379 |
| 2018/0352169 A1* | 12/2018 | Lee | ..................... | H04N 5/23238 |

OTHER PUBLICATIONS

Neuck.com; "LG Has a Smart Phone Development With 16 Cameras"; Nov. 28, 2018; 4 pages (Year: 2018).*
O'Boyle, Britta; "Sony's six-camera phone has key specs leaked"; www.pocket-lint.com; Jun. 19, 2019; 3 pages (Year: 2019).*
O'Kane, Sean; "Light L16 Camera Review: Futuristic Frustration"; www.theverge.com; Apr. 10, 2018; 12 pages (Year: 2018).*
Carrasqueira, Joao; "[MWC2019] Hands on with the Nokia 9 PureView and its five cameras"; www.neowin.net; Feb. 25, 2019; 6 pages (Year: 2019).*

* cited by examiner

*Primary Examiner* — Gary C Vieaux
(74) *Attorney, Agent, or Firm* — Winston Hsu

(57) ABSTRACT

An image capturing system includes a first camera having a first lens, a second camera having a second lens, a third camera having a third lens, a fourth camera having a fourth lens, a fifth camera having a fifth lens, a sixth camera having a sixth lens, and a processor coupled to the six cameras. The processor generates an optimized image according to images captured by at least two of the six cameras. The first lens, the second lens, the third lens and the fourth lens are disposed adjacently. The first lens, the third lens, the fifth lens, and the sixth lens are disposed along a straight line. Fields of view of the first lens, the second lens, the third lens, and the fourth lens are the same.

9 Claims, 2 Drawing Sheets

IMAGE CAPTURING SYSTEM CAPABLE OF GENERATING DIFFERENT TYPES OF OPTIMIZED IMAGES

BACKGROUND OF THE INVENTION

1. Field of the Invention

The present invention is related to an image capturing system, and more particularly, to an image capturing system capable of generating different types of optimized images.

2. Description of the Prior Art

As mobile devices become more and more popular, users also have higher requirements for the applications supported by mobile devices. One of the features drawing the greatest concern is the camera function of mobile devices. Generally, since mobile devices are designed to be small and light, the mobile devices also have strict limitations for the sizes of lenses used by the cameras. Therefore, it is difficult for mobile devices to capture images with high quality acceptable by the users.

In prior art, some of the mobile devices may be equipped with more cameras to optimize the images so as to reach the user's expectation. However, when the user uses the mobile device to capture images in practice, he/her would face all kinds of situations, and it is difficult to satisfy the users by optimizing images captured under different conditions with one single method.

SUMMARY OF THE INVENTION

One embodiment of the present invention discloses an image capturing system. The image capturing system includes a first camera having a first lens, a second camera having a second lens, a third camera having a third lens, a fourth camera having a fourth lens, a fifth camera having a fifth lens, a sixth camera having a sixth lens, and a processor.

The processor is coupled to the first camera, the second camera, the third camera, the fourth camera, the fifth camera, and the sixth camera. The processor generates an optimized image according to images captured by at least two of the first camera, the second camera, the third camera, the fourth camera, the fifth camera, and the sixth camera.

The first lens, the second lens, the third lens and the fourth lens are disposed adjacently. The first lens, the third lens, the fifth lens, and the sixth lens are disposed along a straight line, and fields of view of the first lens, the second lens, the third lens, and the fourth lens are the same. A field of view of the first lens is greater than a field of view of the fifth lens, and the field of view of the fifth lens is greater than a field of view of the sixth lens.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
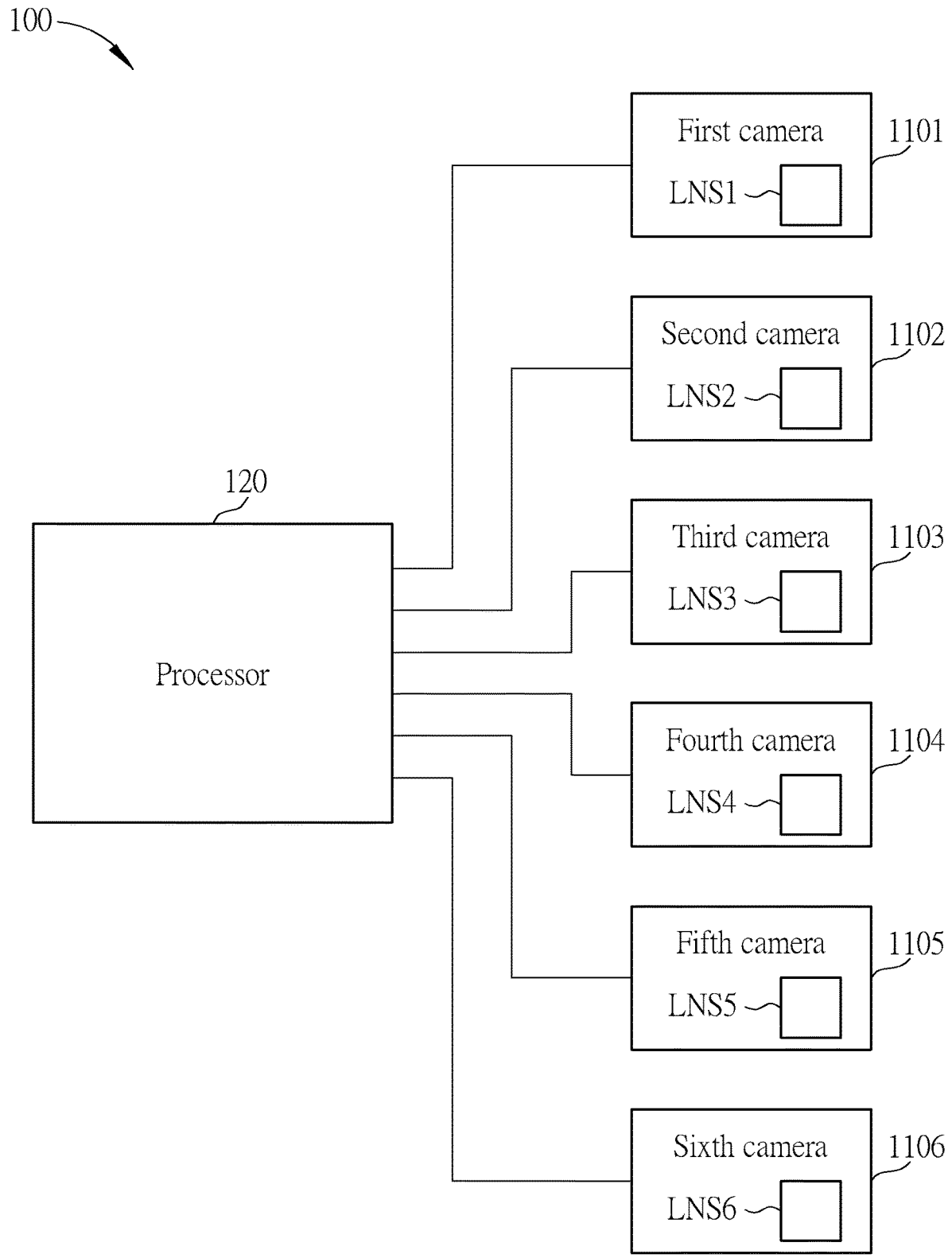
FIG. 1 shows function blocks of an image capturing system according to one embodiment of the present invention.

FIG. 1 shows function blocks of an image capturing system 100 according to one embodiment of the present invention. In FIG. 1, the image capturing system 100 includes a first camera 1101, a second camera 1102, a third camera 1103, a fourth camera 1104, a fifth camera 1105, a sixth camera 1106, and a processor 120. The processor 120 is coupled to the first camera 1101, the second camera 1102, the third camera 1103, the fourth camera 1104, the fifth camera 1105, and the sixth camera 1106.

The processor 120 can generate an optimized image to meet the user's requirement according to at least two images captured by the first camera 1101, the second camera 1102, the third camera 1103, the fourth camera 1104, the fifth camera 1105, and the sixth camera 1106. In some embodiments, the image capturing system 100 can be applied to mobile phones or other types of mobile devices, and the processor 120 can be a central processing unit or an image processor of a mobile phone or mobile device. The processor 120 can execute the image capturing software chosen by system default or the image capturing software designed by the third party.

The first camera 1101 has a first lens LNS1, the second camera 1102 has a second lens LNS2, the third camera 1103 has a third lens LNS3, the fourth camera 1104 has a fourth lens LNS4, the fifth camera 1105 has a fifth lens LNS5, and the sixth camera 1106 has a sixth lens LNS6. In some embodiments, fields of view of the first lens LNS1, the second lens LNS2, the third lens LNS3, and the fourth lens LNS4 can be the same. Also, the field of view of the first lens LNS1 can be greater than the field of view of the fifth lens LNS5, and the field of view of the fifth lens LNS5 can be greater than the field of view of the sixth lens LNS6. For example, the first lens LNS1, the second lens LNS2, the third lens LNS3, and the fourth lens LNS4 can be wide angle lenses, and the fields of view can be, for example but not limited to, 110 degrees. The fifth lens LNS5 can be a standard lens, and the field of view can be, for example but not limited to, 80 degrees. Also, the sixth lens LNS6 can be a long focal length lens, and the field of view can be, for example but not limited to, 30 to 40 degrees.

Figure 2:
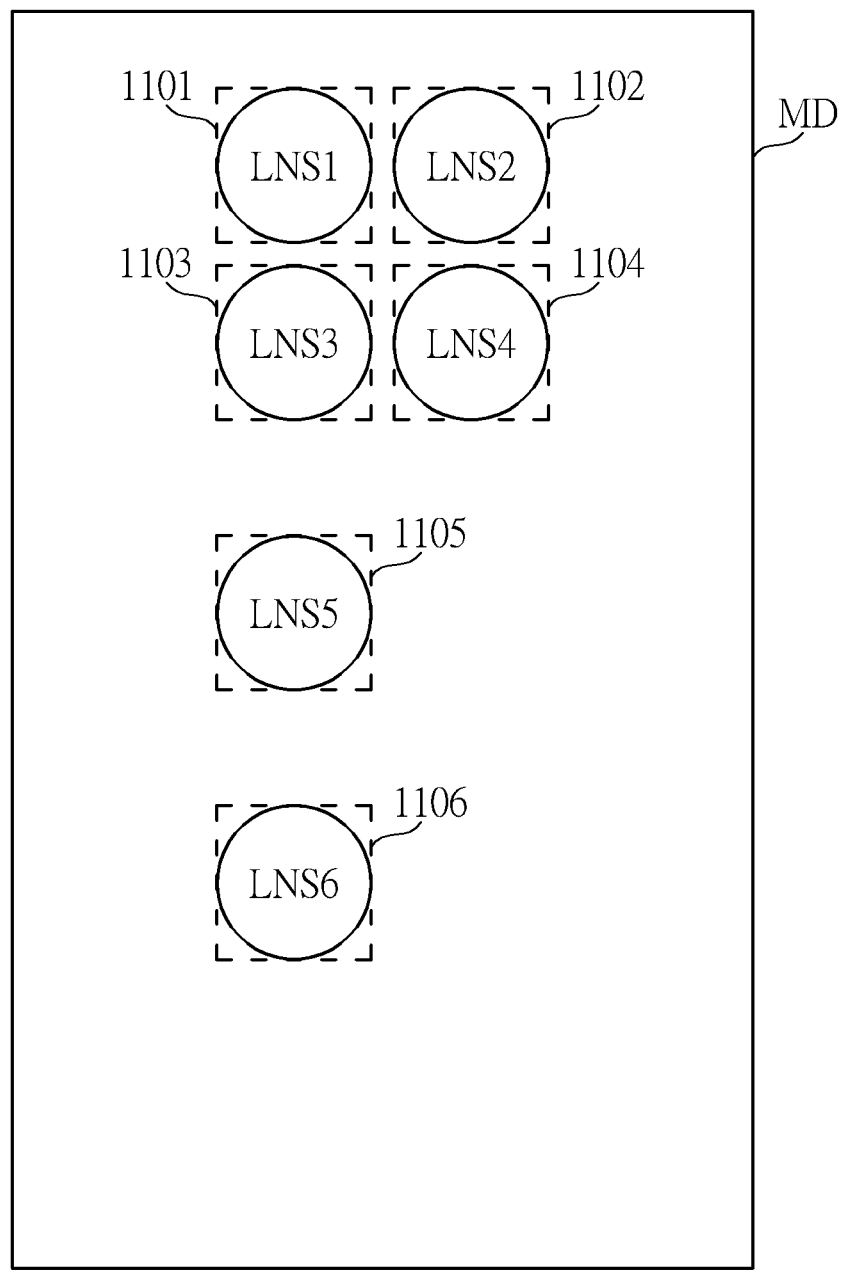
FIG. 2 shows the arrangement of the lens of the image capturing system in FIG. 1 on a mobile device.

FIG. 2 shows the arrangement of the lenses LNS1 to LNS6 of the image capturing system 100 on a mobile device MD. In FIG. 2, the first lens LNS1, the second lens LNS2, the third lens LNS3, and the fourth lens LNS4 can be disposed adjacently. The first lens LNS1, the third lens LNS3, the fifth lens LNS5, and the sixth lens LNS6 can be dispose along a straight line. For example, the first lens LNS1, the second lens LNS2, the third lens LNS3, and the fourth lens LNS4 can be arranged at four corners of a rectangle. The first lens LNS1 and the second lens LNS2 can be disposed at two adjacent corners of the rectangle, the first lens LNS1 and the third lens LNS3 can be disposed at two adjacent corners of the rectangle, and the first lens LNS1 and the fourth lens LNS4 can be disposed at two opposite corners of the rectangle.

In some embodiments, without affecting the hardware allocation, distances between the first lens LNS1, the second lens LNS2, the third lens LNS3, and the fourth lens LNS4 can be designed to be as small as possible. For example, the distance between each two of the lenses LNS1 to LNS4 can be smaller than 5 mm. In this case, images captured by each two of the lenses LNS1 to LNS4 can have a half-pixel shift, and the processor 120 can generate the super-resolution image according to the images captured by the first camera 1101, the second camera 1102, the third camera 1103, and the fourth camera 1104. For example, the processer 120 can obtain the edge information in the images captured by the first camera 1101, the second camera 1102, the third camera 1103, and the fourth camera 1104, forming a super-resolution grid accordingly, and fill the super-resolution grid with corresponding pixels of the images captured by the first camera 1101, the second camera 1102, the third camera 1103, and the fourth camera 1104. In some embodiments, the processor 120 can use other additional steps or other types or algorithms to generate the super-resolution image.

Furthermore, the processor 120 can adjust the exposure time of the first camera 1101, the second camera 1102, the third camera 1103, and the fourth camera 1104 so that the first camera 1101, the second camera 1102, the third camera 1103, and the fourth camera 1104 can capture the same scene with different exposure times. Consequently, the processor 120 would be able to generate a high dynamic range (HDR) image according to the images captured by the first camera 1101, the second camera 1102, the third camera 1103, and the fourth camera 1104.

For example, the processor 120 can pick the clearer parts from the images having different exposure degrees to compose a high dynamic range image that can present the details of both the bright portions and the dark portions. For example, the processor 120 may pick the dark portions of the more exposed image and the bright portions of the less exposed image to compose the optimized image, so that the details in the dark portions will not be too dark to visualize and the details in the bright portions will not be too bright to visualize. Similarly, the processor 120 can generate a wide angle image with enhanced dark portions according to the images captured by the first camera 1101, the second camera 1102, the third camera 1103, and the fourth camera 1104 so that the user can obtain a clear image even in a dark scene, such as at night or indoors.

In some embodiments, the processor 120 may generate the HDR image or the wide angle image with enhanced dark portions by using images captured by three of the first camera 1101, the second camera 1102, the third camera 1103, and the fourth camera 1104.

In addition, in FIG. 2, the fifth lens LNS5 can be disposed between the third lens LNS3 and the sixth lens LNS6. Also, the distance between the third lens LNS3 and the first lens LNS1 is smaller than the distance between the third lens LNS3 and the fifth lens LNS5. That is, with the lenses LNS3, LNS5, and LNS6, the images captured by the cameras 1103, 1105, and 1106 will have obvious parallax. In this case, by performing a proper algorithm, the parallax estimation image can be generated, and the parallax estimation image can be provided for the processor 120 so the processor 120 can generate images with blurry backgrounds or optical zooming images by further processing.

In some embodiments, the distance between the third lens LNS3 and the fifth lens LNS5 and the distance between the fifth lens LNS5 and the sixth lens LNS6 can be very similar. That is, the distances between the two sets of lenses can be substantially equal. In some embodiments, the distance between the third lens LNS3 and the fifth lens LNS5 can be at least 10 mm, ensuring that the parallax between the images captured by the third camera 1103 and the fifth camera 1105 is significant enough. In this case, the processor 120 can calculate the depth information of each object in the scene, that is, the distance between each object and the mobile device MD, according to the images captured by the third camera 1103 and the fifth camera 1105. Then, the processor 120 can generate the parallax estimation image by performing a proper algorithm, and can distinguish the foreground and the background according to the depth information of each object in the scene. Consequently, the image with blurry background can be generated.

Similarly, the distance between the fifth lens LNS5 and the sixth lens LNS6 can be at least 10 mm, ensuring that the parallax between the images captured by the fifth camera 1105 and the sixth camera 1106 is significant enough. Consequently, the processor 120 can generate the parallax estimation image by performing a proper algorithm according to the images captured by the fifth camera 1105 and the sixth camera 1106, and can generate the image with blurry background accordingly. That is, in some embodiments, the processor 120 can generate two background blurred images with the images simultaneously captured by the third camera 1103, the fifth camera 1105, and the sixth camera 1106.

Furthermore, since the fields of view of the third lens LNS3, the fifth lens LNS5, and the sixth lens LNS6 are different, the processor 120 can generate a series of zooming preview images according to the images captured by the third camera 1103, the fifth camera 1105, and the sixth camera 1106 in some embodiments. In some embodiments, since the third lens LNS3, the fifth lens LNS5, and the sixth lens LNS6 are disposed along the same straight line and the distances between each other are known factors, the processor 120 can synthesize images of different viewing angles to achieve the digital zoom function by performing a dynamic viewing angle switching algorithm.

For example, if the field of view chosen by the user is between the field of view of the third lens LNS3 and the field of view of the fifth lens LNS5, the processor 120 can synthesize the images captured by the third camera 1103 and the fifth camera 1105 to generate an image with the chosen field of view. Also, if the field of view chosen by the user is between the field of view of the fifth lens LNS5 and the field of view of the sixth lens LNS6, the processor 120 can synthesize the images captured by the fifth camera 1105 and the sixth camera 1106 to generate an image with the chosen field of view. Consequently, the processor 120 can generate a series of images with different fields of view, and the user can switch freely between different fields of view of shootings in a preview mode. When the user determines to capture images with a specific field of view, the processor 120 can synthesize images captured by the corresponding cameras to generate the image with the field of view determined in the preview mode.

In some embodiments, the processor 120 can capture images with the first camera 1101, the second camera 1102, the third camera 1103, the fourth camera 1104, the fifth camera 1105, and the sixth camera 1106, and can generate at least two of a super-resolution image, a high dynamic range image, a parallax estimation image, an image with blurry background, a series of zooming images, and a wide angle image with enhanced dark portions according to images captured simultaneously by the first camera 1101, the second camera 1102, the third camera 1103, the fourth camera 1104, the fifth camera 1105, and the sixth camera 1106. That is, the image capturing system 100 can generate different types of optimized images for users to select. Since the first camera 1101, the second camera 1102, the third camera 1103, the fourth camera 1104, the fifth camera 1105, and the sixth camera 1106 can capture images simultaneously, the issue of image quality loss caused by moving objects or camera vibration during the repeated shootings of one single camera can be solved.

In summary, the image capturing systems provided by the embodiments of the present invention can include six cameras. The six cameras can have wide angle lenses, standard lenses and long focal length lenses, and can be disposed at positions specifically related to each other. Consequently, the processor of the image capturing system will be able to generate different type of optimized images, such as a super-resolution image, a high dynamic range image, a parallax estimation image, an image with blurry background, a series of zooming images, and a wide angle image with enhanced dark portions, according to images captured simultaneously by the six cameras.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An image capturing system comprising:
   a first camera having a first lens;
   a second camera having a second lens;
   a third camera having a third lens;
   a fourth camera having a fourth lens;
   a fifth camera having a fifth lens;
   a sixth camera having a sixth lens; and
   a processor coupled to the first camera, the second camera, the third camera, the fourth camera, the fifth camera, and the sixth camera, and configured to generate an optimized image according to images captured by at least two of the first camera, the second camera, the third camera, the fourth camera, the fifth camera, and the sixth camera;
   wherein:
   the first lens, the second lens, the third lens and the fourth lens are disposed adjacently at four corners of a rectangle;
   the first lens and the second lens are disposed at two adjacent corners of the rectangle;
   the first lens and the third lens are disposed at two adjacent corners of the rectangle;
   the first lens, the third lens, the fifth lens, and the sixth lens are disposed along a straight line;
   fields of view of the first lens, the second lens, the third lens, and the fourth lens are the same; and
   a field of view of the first lens is greater than a field of view of the fifth lens, and the field of view of the fifth lens is greater than a field of view of the sixth lens.

2. The image capturing system of claim 1, wherein:
   the fifth lens is disposed between the third lens and the sixth lens; and
   a distance between the first lens and the third lens is smaller than a distance between the fifth lens and the third lens.

3. The image capturing system of claim 2, wherein:
   the distance between the fifth lens and the third lens is substantially equal to a distance between the fifth lens and the six lens; and
   the distance between the fifth lens and the third lens is at least 10 mm.

4. The image capturing system of claim 1, wherein:
   the processor generates a super-resolution image according to images captured by the first camera, the second camera, the third camera, and the fourth camera.

5. The image capturing system of claim 1, wherein:
   the processor generates a high dynamic range image according to images captured by at least three of the first camera, the second camera, the third camera, and the fourth camera.

6. The image capturing system of claim 1, wherein:
   the processor generates a first image with blurry background according to images captured by the third camera and the fifth camera, and/or generates a second image with blurry background according to images captured by the fifth camera and the sixth camera; and
   the processor generates a first parallax estimation image according to images captured by the third camera and the fifth camera, and/or generates a second parallax estimation image according to images captured by the fifth camera and the sixth camera.

7. The image capturing system of claim 1, wherein:
   the processor generates a series of zooming preview images according to images captured by the third camera, the fifth camera, and the sixth camera.

8. The image capturing system of claim 1, wherein:
   the processor generates a wide angle image with enhanced dark portions according to images captured by the first camera, the second camera, the third camera, and the fourth camera.

9. The image capturing system of claim 1, wherein:
   the processor generates at least two of a super-resolution image, a high dynamic range image, a parallax estimation image, an image with blurry background, and a wide angle image with enhanced dark portions according to images captured simultaneously by the first camera, the second camera, the third camera, the fourth camera, the fifth camera, and the sixth camera.

* * * * *